(12) United States Patent
Morimoto

(10) Patent No.: US 7,917,410 B2
(45) Date of Patent: Mar. 29, 2011

(54) REAL-TIME ACCOUNTING USING WIRELESS TRAFFIC CONTROL

(76) Inventor: Nobuyoshi Morimoto, Taipei (TW)

(*) Notice: Subject to any disclaimer, the term of this patent is extended or adjusted under 35 U.S.C. 154(b) by 2210 days.

(21) Appl. No.: 10/134,261

(22) Filed: Apr. 29, 2002

(65) Prior Publication Data
US 2002/0188558 A1  Dec. 12, 2002

Related U.S. Application Data

(60) Provisional application No. 60/291,505, filed on May 15, 2001.

(51) Int. Cl.
*G07B 17/00* (2006.01)

(52) U.S. Cl. .................. 705/30; 705/4; 705/33; 705/35; 705/39; 705/40

(58) Field of Classification Search ................ 705/4, 26, 705/27, 30
See application file for complete search history.

(56) References Cited

U.S. PATENT DOCUMENTS

| | | | |
|---|---|---|---|
| 5,875,435 A * | 2/1999 | Brown | 705/30 |
| 5,920,848 A | 7/1999 | Schutzer et al. | |
| 5,930,772 A | 7/1999 | Gomyo et al. | |
| 6,041,312 A | 3/2000 | Bickerton et al. | |
| 6,088,688 A | 7/2000 | Crooks et al. | |
| 6,144,946 A | 11/2000 | Iwamura | |
| 6,272,528 B1 * | 8/2001 | Cullen et al. | 705/36 R |
| 6,315,196 B1 * | 11/2001 | Bachman | 235/380 |
| 6,408,284 B1 * | 6/2002 | Hilt et al. | 705/40 |
| 6,532,450 B1 * | 3/2003 | Brown et al. | 705/40 |
| 6,629,081 B1 * | 9/2003 | Cornelius et al. | 705/30 |
| 6,684,189 B1 * | 1/2004 | Ryan et al. | 705/4 |
| 2001/0047326 A1 * | 11/2001 | Broadbent et al. | 705/38 |
| 2001/0049632 A1 * | 12/2001 | Rigole | 705/26 |
| 2002/0042763 A1 * | 4/2002 | Pillay et al. | 705/35 |
| 2002/0188484 A1 * | 12/2002 | Grover et al. | 705/4 |
| 2003/0135461 A1 * | 7/2003 | Brown et al. | 705/40 |
| 2005/0058263 A1 * | 3/2005 | Frazier | 379/88.13 |

FOREIGN PATENT DOCUMENTS

WO  99/28873  6/1999

OTHER PUBLICATIONS

VISA, "Chip Cards," http://www.visaeu.com/smartcards/general_information/main.html, 2001, 5 pages.
Switch, "What is Switch," http://www.switch.co.uk/home.asp and http://www.switch.co.uk/how.htm, 1998, 2 pages.
International Search Report for GB 0209491.0 mailed Dec. 9, 2002, 5 pages.

* cited by examiner

*Primary Examiner* — M. Thein
(74) *Attorney, Agent, or Firm* — Robert C. Kowert; Meyertons, Hood, Kivlin, Kowert & Goetzel, P.C.

(57) ABSTRACT

A method for real time accrual basis accounting may involve detecting a purchase made via a computer network and obtaining a guarantee for the payment via the network based on the determined method of payment. The guarantee may be an escrow account or an insurance policy that guarantees payment. The premium may be charged back to the client. At least a portion of the proceeds of from the sale may be recorded as income in a general ledger database in real time. Network-enabled assets may provide automated depreciation updates to further automate the accounting process.

27 Claims, 7 Drawing Sheets

REAL-TIME ACCOUNTING USING WIRELESS TRAFFIC CONTROL

CROSS-REFERENCE TO RELATED APPLICATIONS

This application claims the benefit of U.S. Provisional Application No. 60/291,505, filed May 15, 2001.

BACKGROUND OF THE INVENTION

1. Field of the Invention

The present invention generally relates to the field of accounting, and more particularly to transmitting and receiving data in a network to allow real time updating of accounting information.

2. Description of the Related Art

Two types of accounting systems in use today are cash basis accounting and accrual basis accounting. Cash basis accounting records income when cash is received and records expenses when bills are paid. Accrual basis accounting records income when the income is earned and expenses when they are incurred. While both cash and accrual methods are currently in use, cash accounting is typically not considered as good a measure of performance as accrual accounting. This is because economic events do not always occur at the same time that cash is exchanged. A principal reason why large corporations do not use cash accounting is that the timing of cash receipts and disbursements does not necessarily correspond to when benefits are received or efforts are expended. Accrual accounting, however, involves more subjective measurements than cash accounting, and thus may be more difficult to implement.

The differences in these two methods can be highlighted using the following example. Assume that a business has performed the following transactions: (a) bought $100 of goods on credit; (b) sold $20 of those goods for $50 cash, (c) sold $30 of goods for $70 to a customer who charged their entire purchase, (d) received $30 in partial payment from Tuesday's charge customer, (e) made a $40 partial payment on the goods bought on credit, and finally (f) sold $30 of the goods bought on credit for $50 cash. This sequence of transactions would be reflected as follows:

|  | Cash | Accural |
|---|---|---|
| Accomplishment (inflow) | 50 + 30 + 50 = 130 | 50 + 70 + 50 = 170 |
| Effort Expended (outflow) | 40 | 20 + 30 + 30 = 80 |

Even though accrual basis accounting is generally considered to more accurately reflect the current state of an entity, it is not always used because it may require a great deal of effort to implement and maintain. One particularly labor intensive aspect of accrual basis accounting is making the determination of when to recognize income and expenses. This process may be somewhat subjective and may vary from one business to another. To further complicate matters, companies in different countries may have to follow different accounting and tax rules regarding when a particular type of income or expense should be recognized.

Thus, a system and method for accounting that increases the efficiency of accounting systems is desired. In particular, a system and method that provides some of the benefit of accrual basis accounting while increasing efficiency is also desired.

SUMMARY

A system and method for accounting in real-time using a networked computer system as described herein may be implemented. In one embodiment, a method may include detecting a purchase made by a customer using a computer connected to the accounting system via the network. For example, the customer may make a purchase from a retail or business-to-business web site. The accounting system may determine a particular method of payment specified by the customer for the purchase. For example, the customer may enter a credit card account number to pay for the transaction.

Once the payment method has been determined, the accounting system may use the computer network to obtain a guarantee for payment. The type of guarantee obtained may vary depending on the type of payment method selected by the customer. For example, if a customer elects to use a credit card for payment, the accounting system may contact a server from a credit card company via the computer network to obtain an authorization for the charge. In another example, if a customer specifies that a debit card or a electronic funds transfer (e.g., a wire transfer) will be used to pay for the purchase, then the accounting system may be configured to contact the corresponding financial institution's (e.g., a bank, savings and loan, or credit union) computer via the network in order to obtain a guarantee for payment. For example, in one embodiment the guarantee for payment may be an acknowledgement of sufficient funds or an acknowledgement of a wire transfer of the funds in real-time. In another embodiment, the guarantee for payment may be an acknowledgment of a transfer of the funds to an escrow agent or account. In still other embodiments, the guarantee may be the issuance of an insurance policy that guarantees payment.

Once the guarantee for payment has been received, the accounting system may automatically record the payment as income in a general ledger database. The general ledger database may be hosted on the accounting system or connected to the accounting system via the computer network. The guarantee and the recording of the income in the general ledger may be performed in real-time, thereby allowing the accounting system to perform accrual basis accounting on a real-time or near real-time basis. This may serve to remove some of the uncertainty with regard to when a sale may or should be recorded as income.

As noted above, the method may include contacting an escrow agent's computer or server (e.g., from a bank or a third-party escrow service) in order to obtain a guarantee or assurance for payment. In some embodiments, the guarantee or assurance for payment may be conditioned upon satisfactory compliance with one or more terms of the sales contract. For example, a delivery deadline may be used as a condition upon release of the payment from the escrow company. By networking the accounting system with the escrow service computer, status updates and corresponding entries in the general ledger may be performed automatically and in real-time. For example, once the purchased product is received by the customer, a shipping company (e.g., the United Parcel Service) may automatically convey an electronic message to the escrow agent server to indicate that delivery (i.e., one of the conditions of the sales contract) has taken place. The escrow server may then automatically notify the accounting system that the funds have been released (e.g., transferred to the seller's account). The accounting system may also be configured to automatically update the general ledger database in response to the release of the funds from the escrow server.

In some cases, the customer may elect not to use a credit card or direct payment mechanism such as a debit card or wire transfer from a bank account. Instead, the customer may wish to utilize a direct line of credit with the seller. In these cases, it may be advantageous for the accounting system to nevertheless be configured to accept the order and immediately recognize the value of the transaction as income. In these embodiments, the accounting system may be configured to contact a credit reporting bureau computer in order to obtain a credit report or credit rating for the customer. Based on this credit report or credit rating, the accounting system may be configured to automatically recognize a certain percentage of the sales amount as income based on the likelihood that the customer will eventually pay the amount owed. In yet another embodiment, the accounting system may be configured to automatically contact an insurance company server in order to obtain a quote for insurance that guarantees the customer's payment of the contracted amount. In some embodiments, the server may be configured to add the amount of the quote to the sales price and re-verify the customer's desire to proceed with the transaction. Assuming the customer agrees to proceed with the amended transaction, the e-commerce server may then be configured to automatically recognize the amount of the initial sales price as income in the general ledger database. In other embodiments, the accounting system may be configured to subtract out the amount paid to the insurance company for the guarantee of payment. In these embodiments, it is likely that the seller will absorb the price of the insurance for a guarantee of payment as a cost of doing business instead of requesting that the customer absorb the cost.

As noted above, in some embodiments, the accounting system may be configured to contact the customer to amend the terms of the initial sales contract based on information provided by either the credit reporting bureau and/or the insurance company server. In response thereto, in some embodiments the accounting system may be configured to request a second form of payment from the customer in order to (a) pay for the credit reporting and/or insurance for payment services, or (b) reduce the amount of the payment that is processed through the first payment method. The accounting system may be configured to automatically and periodically record varying portions of the payment amount as income in the general ledger database. For example, the portions recorded as income may be determined according to a predetermined formula that is based on the amount of time that has lapsed since the purchase and through the terms of the purchase.

In one embodiment, the system for real-time accounting may include an e-commerce server that is connected to a computer network. The e-commerce server may be configured to execute a software program that is configured to perform one of the methods described above. The e-commerce server may be connected to a number of different computers via the computer network (e.g., a credit reporting bureau server, a general ledger database server, a guarantee insurance company server, an escrow server, and a credit card or bank server). Similarly, the e-commerce server may also be connected to one or more customers' computers via the computer network.

A software program embodied on a computer readable medium configured to perform real-time accounting when executed is also contemplated. In one embodiment, the software may be configured to perform the method described above when executed.

BRIEF DESCRIPTION OF THE DRAWINGS

Other aspects of the invention will become apparent upon reading the following detailed description and upon reference to the accompanying drawings in which.

Figure 1:
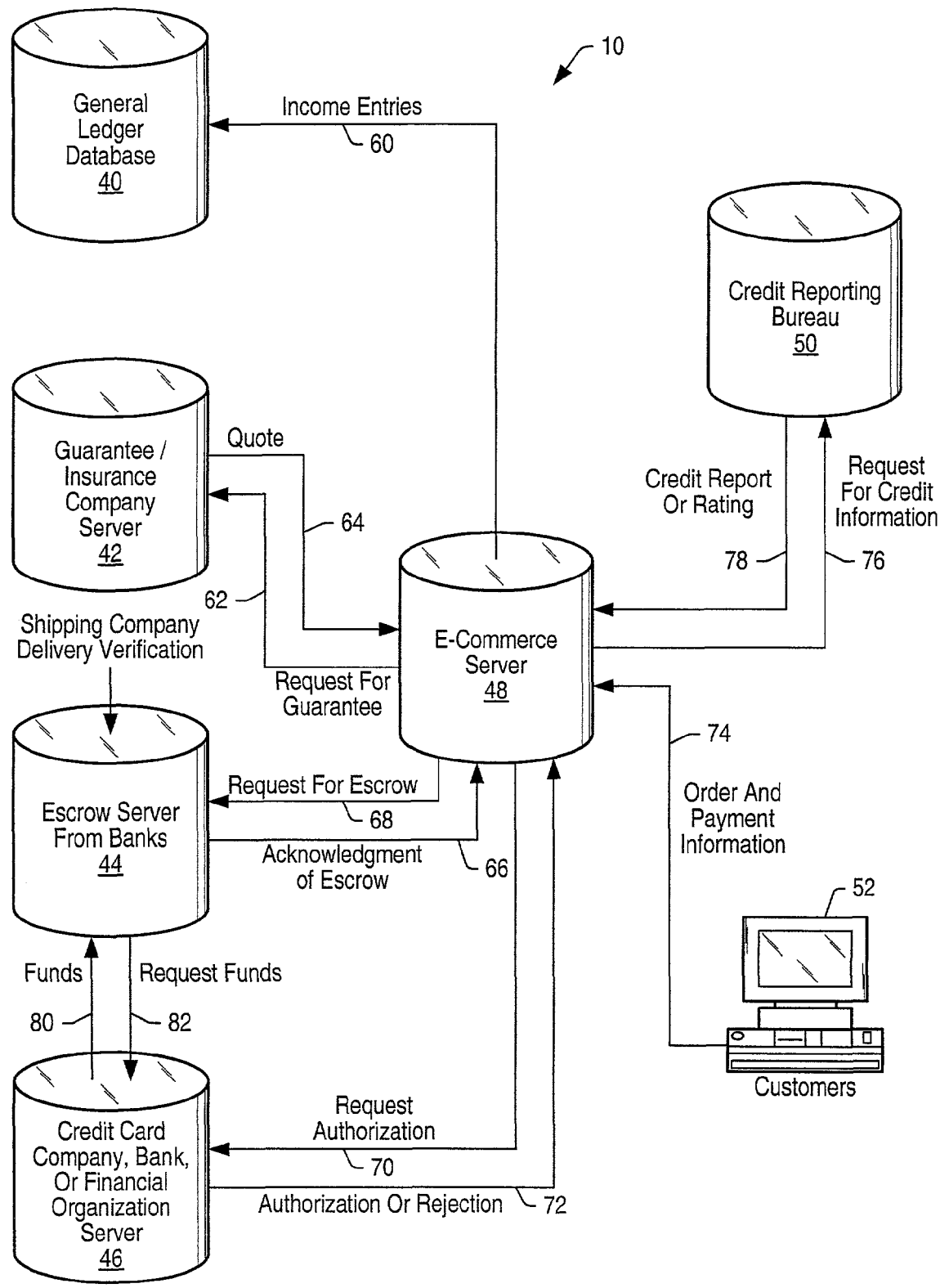
FIG. 1 is a diagram illustrating one embodiment of a system for real time accrual basis accounting using a computer network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Turning now to FIG. 1, one embodiment of a system 10 for real-time accounting is shown. In this embodiment, the system 10 includes an e-commerce server 48 that is connected to a computer network. The computer network allows the e-commerce server 48 to communicate with a number of other computers. For example, e-commerce server 48 may communicate with customers' computers 52. In one embodiment, the e-commerce server 48 may be configured to receive order and payment information 74 from customers' computers 52. E-commerce server 48 may also be configured to process the order and payment information. For example, assuming the customer desires to pay for the order using a bank card such as a credit card or debit card, the e-commerce server 48 may be configured to issue a request for authorization 70 to a credit card company, bank, or financial organization server 46. In response thereto, if the customer's account has sufficient funds or sufficient credit available, server 46 may respond with an authorization 72. Similarly, if customer's account does not have sufficient funds or credit, server 46 may respond with a rejection. As shown in the figure, both the request for authorization 70 and the authorization or rejection 72 may be conveyed across the computer network to e-commerce server 48. In one embodiment, the generation of the request authorization 70 and the receipt of the authorization or rejection 72 is in real-time.

Assuming instead that the customer indicates that a different payment means will be used (e.g., a credit slip or credit account), e-commerce server 48 may be configured to poll a credit reporting bureau's server 50 with a request for credit information 76 across the computer network. The credit reporting bureau server 50 may respond with a credit report or a credit rating 78. In response thereto, e-commerce server 48 may be configured to determine what portion of the payment the customer is likely or probable to pay. For example, assuming the customer's credit rating or credit report 78 indicates that the customer is a very good credit risk, e-commerce server 48 may be configured to generate an income entry for 50% of the purchase amount. As shown in the figure, the income entry 60 may be generated to update the general ledger database 40. In one embodiment, general ledger database 40 may reside on e-commerce server 48. In other embodiments, however, general ledger database 40 may reside on another computer or server connected to e-commerce server 48 via the computer network.

In yet another embodiment, e-commerce server 48 may be configured to utilize the credit report or credit rating 78 received from credit reporting bureau 50 to generate a request for payment guarantee or insurance for payment 62. This request for guarantee 62 may be conveyed via the computer network to a guarantee company or insurance company server 42. The insurance company may then provide a quote 64 back to the e-commerce server 48. The quote may specify a price or premium that the insurance company will charge to issue the payment insurance (i.e., to guarantee payment by the customer). In some embodiments, the insurance company server may directly access the credit reporting bureau server 50. In other embodiments, e-commerce server 48 may provide or forward the credit report or credit rating 78 to the insurance company server 42. Depending on the embodiment, e-commerce server 48 may be configured to modify the initial sales contract terms in order to reflect the additional cost of the guarantee insurance (i.e., the value of quote 64). In some cases, e-commerce server 48 may require additional payment means from the customer to cover this insurance premium. For example, the e-commerce server 48 may require a credit card that can be charged for the insurance premium. In this event, the credit card provided from customer's computer 52 may be provided to server 46 in order to obtain an authorization 72 as previously described above. In other embodiments, e-commerce server 48 may be configured to subtract out the price of the guarantee for payment insurance from the amount entered into the general ledger database by income entries 60. In these embodiments, the seller will absorb the cost of the payment insurance instead of passing it on to the customer.

In still other embodiments, an escrow service having an escrow server 44 may be used to implement the transaction. In these embodiments, the escrow server 44 may be configured to be in direct communications with a financial organization such as a bank in order to allow the transfer of funds electronically from the bank to the escrow server (80 and 82). As shown in the figure, payment information from customer's computer 52 may be forwarded by e-commerce server 48 to escrow server 44 and/or financial organization server 46 in order to allow funds 80 to be requested 82 and transferred to the escrow agent. Escrow agents typically release the escrowed funds upon the satisfaction of one or more conditions. In one embodiment, a condition for the release of the escrow funds may be the receipt by the escrow server 44 of notification from a shipping company that the ordered products have been received by the customer. Some shipping companies (e.g., the United Parcel Service) provide on-line tracking of shipment and delivery. Advantageously, escrow server 44 may be configured to poll the shipping company's server to determine when the shipment was received by the customer and thus when to release the escrow funds. As shown in the figure, e-commerce server 48 may be configured to communicate with escrow server 44 in order to request the establishment of an escrow account 68 and to receive acknowledgment of the creation of such account 66.

In one embodiment, the computer network shown in FIG. 1 may be a wide area network (WAN) such as the Internet. In other embodiments, the network may be or may include one or more local area networks (LANs). As noted above, in one embodiment the communications between e-commerce server 44 and the other computers and servers (50, 52, 40, 42, 44, and 46) may occur substantially in real-time. These real-time communications may allow general ledger database 40 to be updated on an accrual basis but nevertheless in real-time for income entries. A similar system of interconnections between e-commerce server 48, financial organization server 46, and other servers for third parties may be utilized to perform the same type of real-time updating to general ledger database 40 for expenses. For example, once an item is ordered by the seller that uses e-commerce server 48 (e.g., from a wholesaler), e-commerce server 48 may be configured to wire funds from the financial organization server 46 directly to the vendor's bank account. E-commerce server 48 may then be configured to automatically convey an expense entry to the general ledger database 40.

Figure 2:
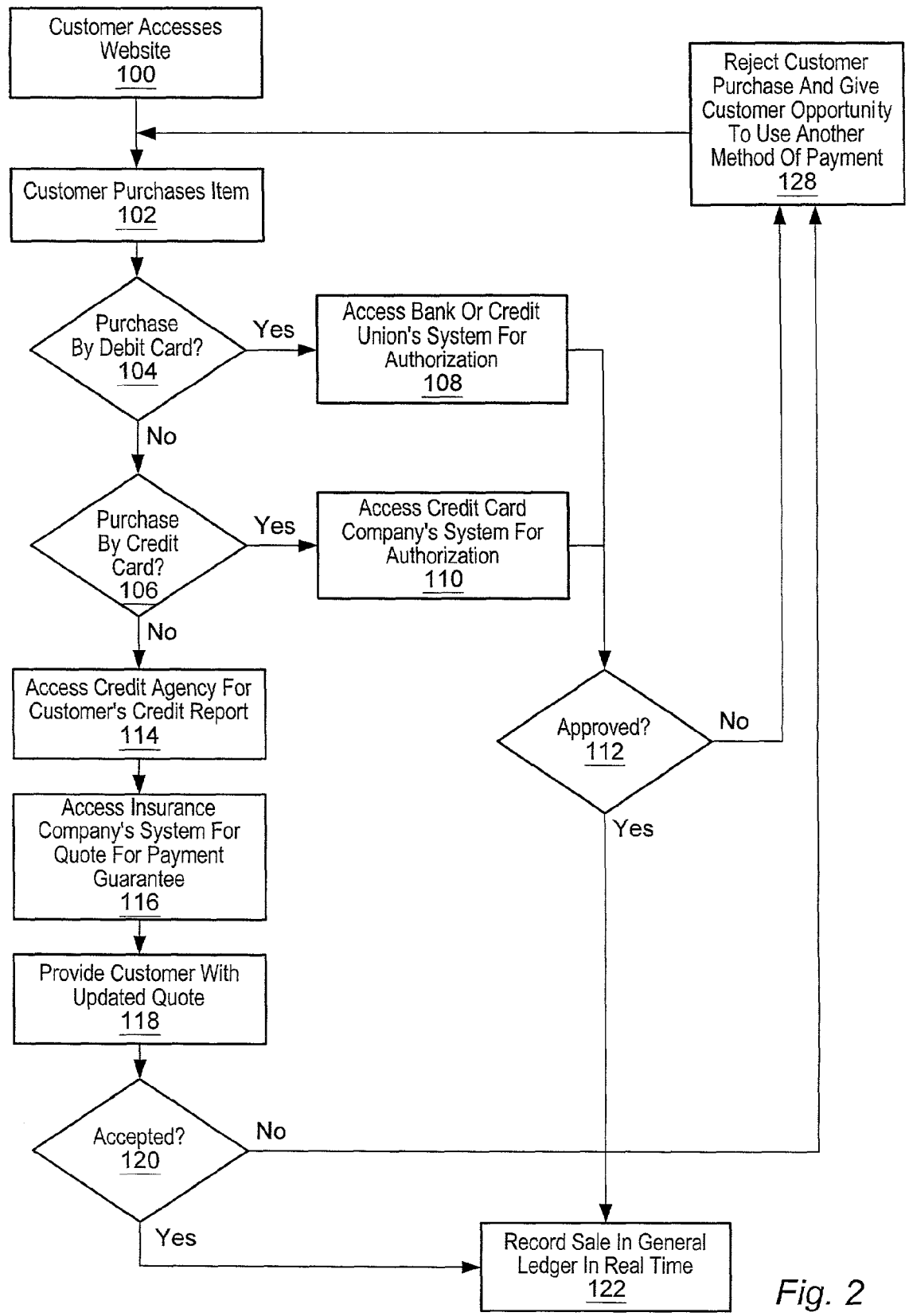
FIG. 2 is a flowchart illustrating one embodiment of a method for real time accrual basis accounting using a computer network.

Turning now to FIG. 2, one embodiment of a method for real-time accounting utilizing a computer network is shown. In this embodiment, a customer may access the company's server or website (100). After perusing the company's offerings on the server or website, the customer may elect to purchase an item (102). In response to detecting the customer's purchasing decision, the server may prompt the customer for payment information. For example, the server may ask the customer whether the customer desires to purchase the item using a debit card (104). If the customer wishes to use a debit card, the server may be configured to access the corresponding bank or credit union's system for authorization (108). Similarly, the server may be configured to ask the customer whether a credit card will be used to pay for the purchase (106).

If a credit card is used, the server may be configured to access the credit card company's system for authorization (110). If the authorization system approves the transaction then the sale may be recorded in real-time in the general ledger (122). If the system for authorization does not approve the purchase (e.g., as the result of a lack of funds or credit) then the customer may receive a rejection message and may be given the opportunity to provide another means of payment (128). If the customer instead decides to pay for the purchase via credit extended by the seller, the seller's server may be configured to directly access a credit agency in order to obtain the customer's credit rating and/or credit report (114). As noted above, these steps may be performed substantially in real-time. As also noted above, in some embodiments the seller's server may be configured to utilize the credit reporting information to obtain a quote for payment guarantee (i.e., payment insurance) from an insurance company (116). If the insurance company is willing to provide insurance that guarantees payment by the customer, then the seller's server may provide the customer with an updated quote for the sales transaction that includes the insurance premium charged by the insurance company (or some portion thereof)

for the payment guarantee (118). The customer may then be provided with an opportunity to either accept or reject the updated quote or sales terms (120). If the customer accepts the terms, the sale may be recorded in the general ledger in real-time (122) because payment is assured.

As noted above, in some embodiments the seller's server may be configured to access an escrow service in order to establish an escrow account to protect the customer and the seller. The method described above is preferably performed in software, but some embodiments may utilize a combination of hardware and software or hardware only solutions. Please note that the method described above is merely one embodiment, and other embodiments are possible and contemplated. Similarly, some of the functions identified in the flowchart may be performed in parallel or in a different order, and additional functions may be added or some functions may be omitted, depending on the implementation.

Figure 3:
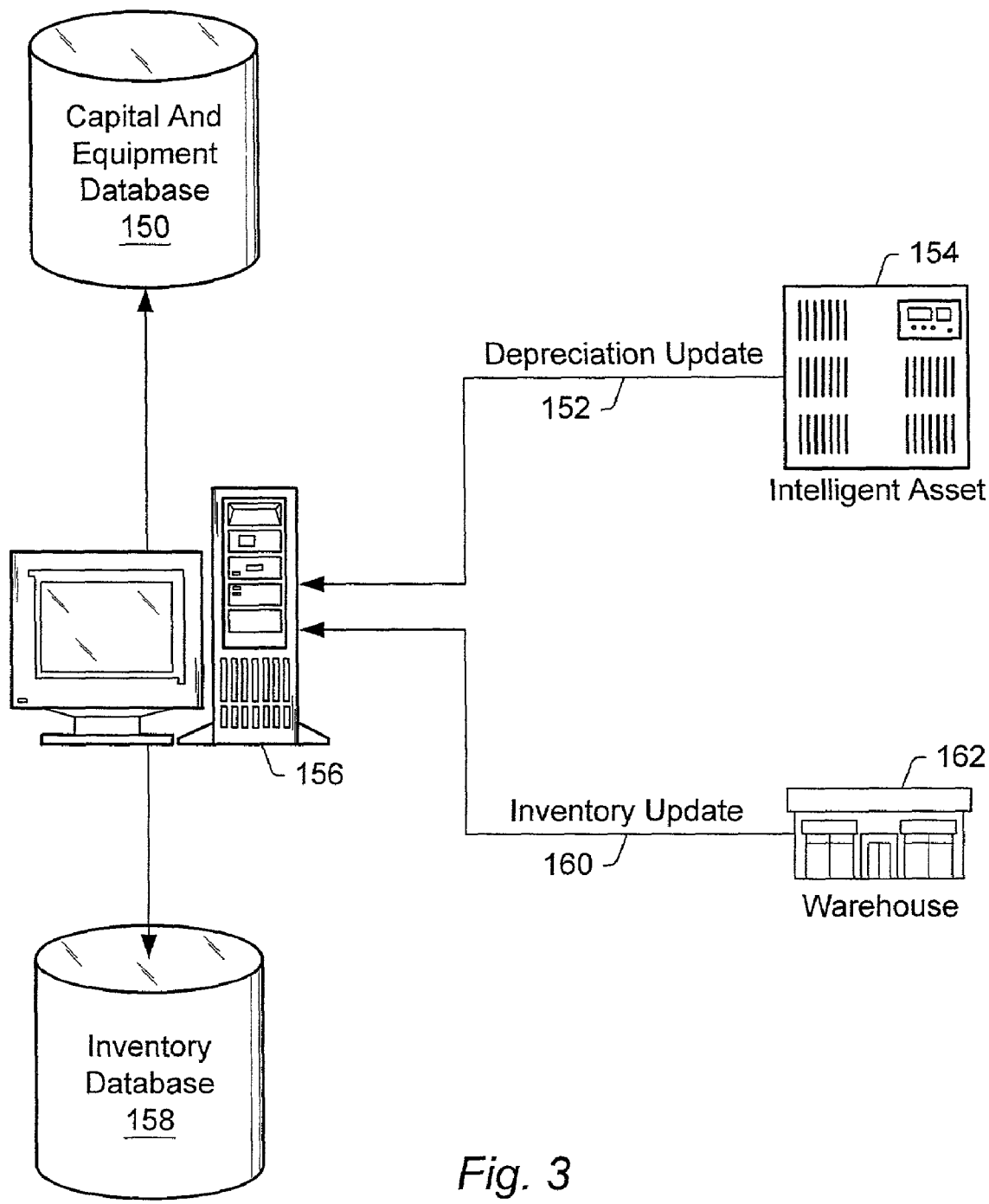
FIG. 3 is a figure illustrating details of one embodiment of a method for tracking depreciation and inventory.

Turning now to FIG. 3, one embodiment of a method for accounting in real-time using a computer network is shown. In this embodiment, a computer system 156 is configured to access a table or database of capital and equipment information 150 and inventory information 158 in real-time. In many accounting systems, purchases of assets such as equipment and inventory are tracked in separate tables or databases such as capital equipment database 150 and inventory database 158. These tables or databases allow the accounting system to generate accurate balance sheets that account for the assets of a company.

In one embodiment, server 156 may also be coupled to one or more intelligent assets 154. An example of an intelligent asset may be a piece of computerized manufacturing equipment. As the price of microprocessors and micro-controllers have decreased, ever increasing numbers of products are being offered with embedded control logic and network communications capabilities. For example, one example of an intelligent asset 154 may be a refrigerator used by a manufacturer of food items. If the refrigerator intelligent asset 154 is network enabled, it may be configured to communicate information to accounting server 156. In one embodiment, some of these updates may include depreciation updates 152. For example, many countries have specific laws that govern how particular classes of assets should be depreciated for taxation purposes. These laws typically include a predetermined life span and depreciation formula for each class of asset. For example, in some countries refrigerators may be classified as light machinery and therefore subject to a straight line depreciation schedule over five years. A network-enabled piece of equipment such as intelligent asset 154 may be configured to automatically send depreciation updates 152 to accounting system server 156 on a periodic basis. This may reduce the amount of work required by the company's bookkeepers or accountants in order to track the depreciation of intelligent assets.

Similarly, modern manufacturing equipment (e.g., conveyor belts and automated pick and place machines) may also be network enabled. This may allow a warehouse 160 with network enabled equipment to provide real-time updates to accounting server 156 regarding the amount of inventory currently in place. Accounting server 156 may be configured to generate corresponding inventory adjustment entries for inventory database 158. In some embodiments, capital equipment database 150 and inventory database 158 may reside on server 156. In other embodiments, databases 150 and 158 may reside on different servers that are connected to accounting server 156 via a computer network.

Figure 4:
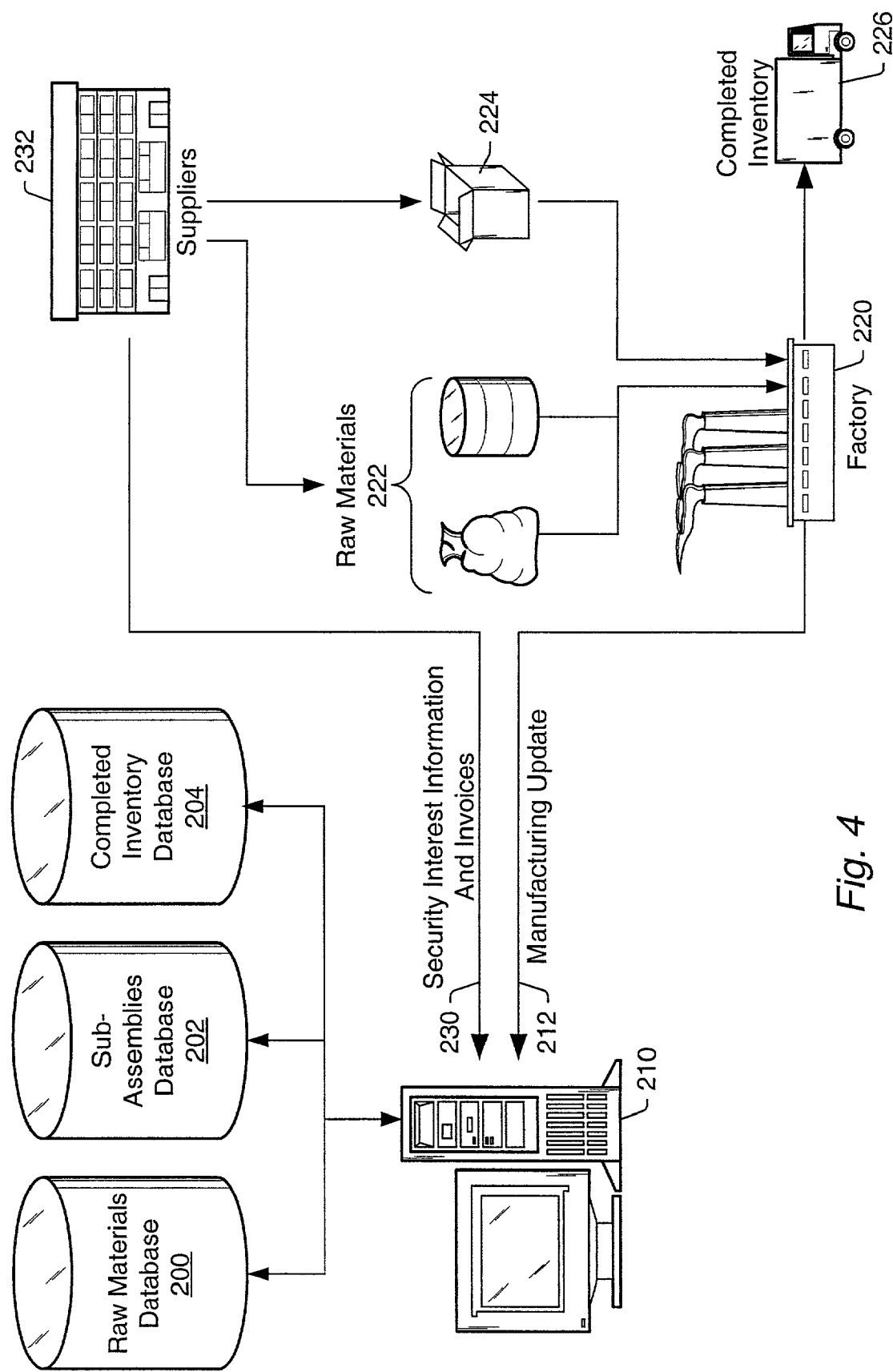
FIG. 4 is a figure illustrating details of one embodiment of a method for tracking production-related information in real time.

Turning now to FIG. 4, another embodiment of a method for real-time accounting using a computer network is shown. In this embodiment, accounting server 210 may be configured to update a number of databases (e.g., raw materials database 200, sub-assemblies database 202, and completed inventory database 204). Accounting server 210 may also be connected to sensors and/or computers within factory 220 in order to receive manufacturing updates 212. Manufacturing updates 212 may be provided in real-time to accounting server 210. Similarly, accounting server 210 may also be connected via the computer network to one or more suppliers 232. Suppliers 232 may be configured to provide factory 220 with raw materials 222 and sub-assemblies 224. Sensors and equipment within factory 220 may be configured to track the levels of raw materials 222 and 224 that are received in factory 220 and that leave factory 220 as part of complete inventory 226. Factory 220 may be configured to provide these manufacturing updates 212 in real-time to accounting server 210 to reflect the levels of raw materials 222 and sub-assemblies 224 presently in factory 220. This may allow accounting server 210 to update databases or tables 200, 202, and 204 in real-time. In some embodiments, suppliers 232 may be connected to accounting server 210 directly or through their financial institution's servers in order to provide security interest information and invoice information 230. In one embodiment, security interest and invoice information 230 is provided in real-time from suppliers 232 to accounting server 210. In some embodiments, the timing of this information may be dictated by computerized tracking of shipments from suppliers 232 to factory 220.

The systems and methods illustrated in FIGS. 1 through 4 may allow an accounting server to track different database and account levels to allow real-time accrual-based accounting. As noted above, these methods may, in some embodiments, reduce the number of subjective decisions that current accounting systems require their operators to make. In some embodiments, some transactions or reporting may be performed in real-time while others may be performed off-line. In some embodiments, a single accounting server may track both general ledger entries, capital and equipment and inventory databases, and raw materials, sub-assemblies, and completed inventory databases. In other embodiments, one or more separate servers may be used to maintain these databases.

Figure 5:
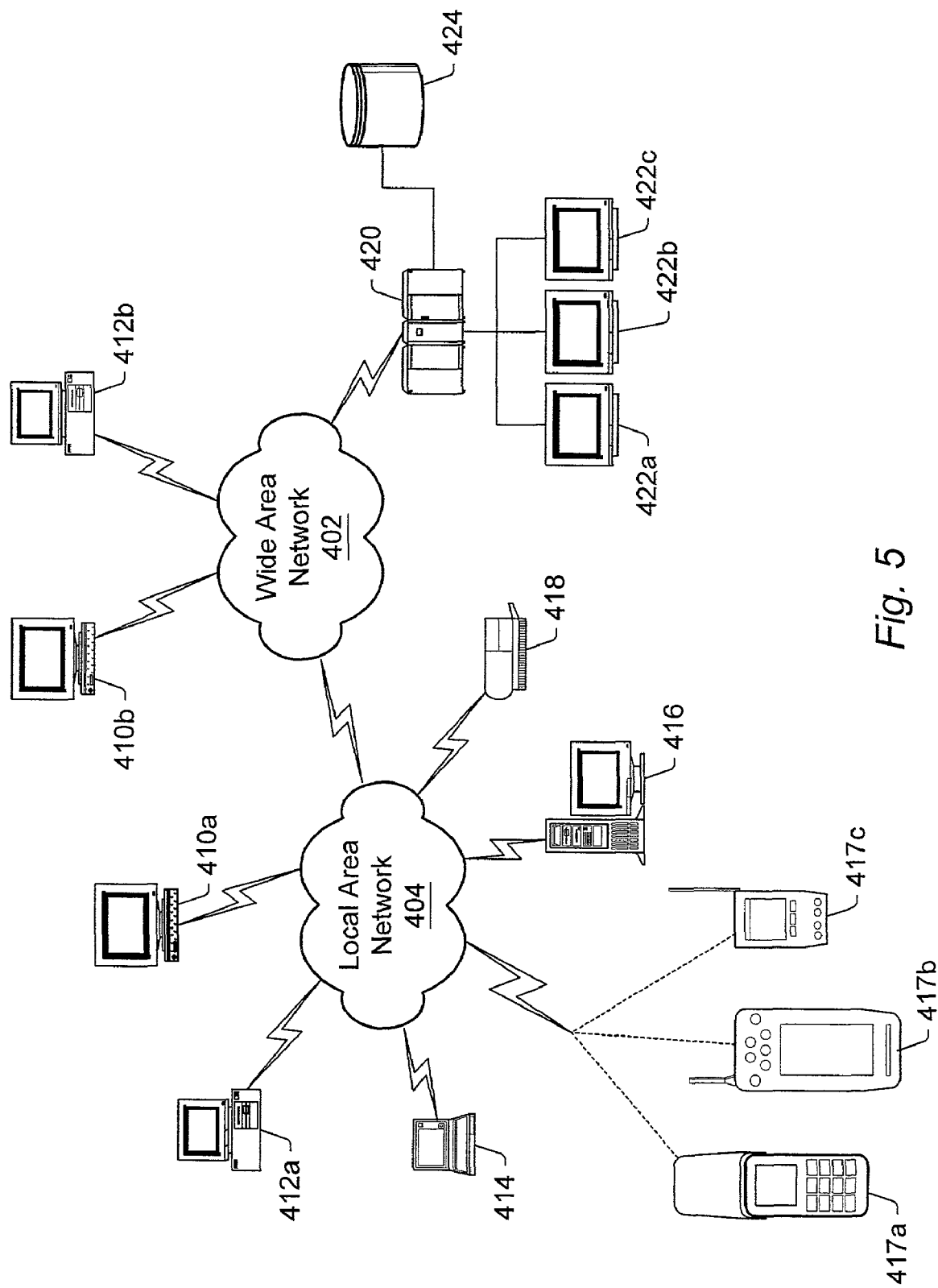
FIG. 5 is a figure illustrating one embodiment of a network that may be utilized to implement one embodiment of a real time accrual basis accounting system.
Figure 6:
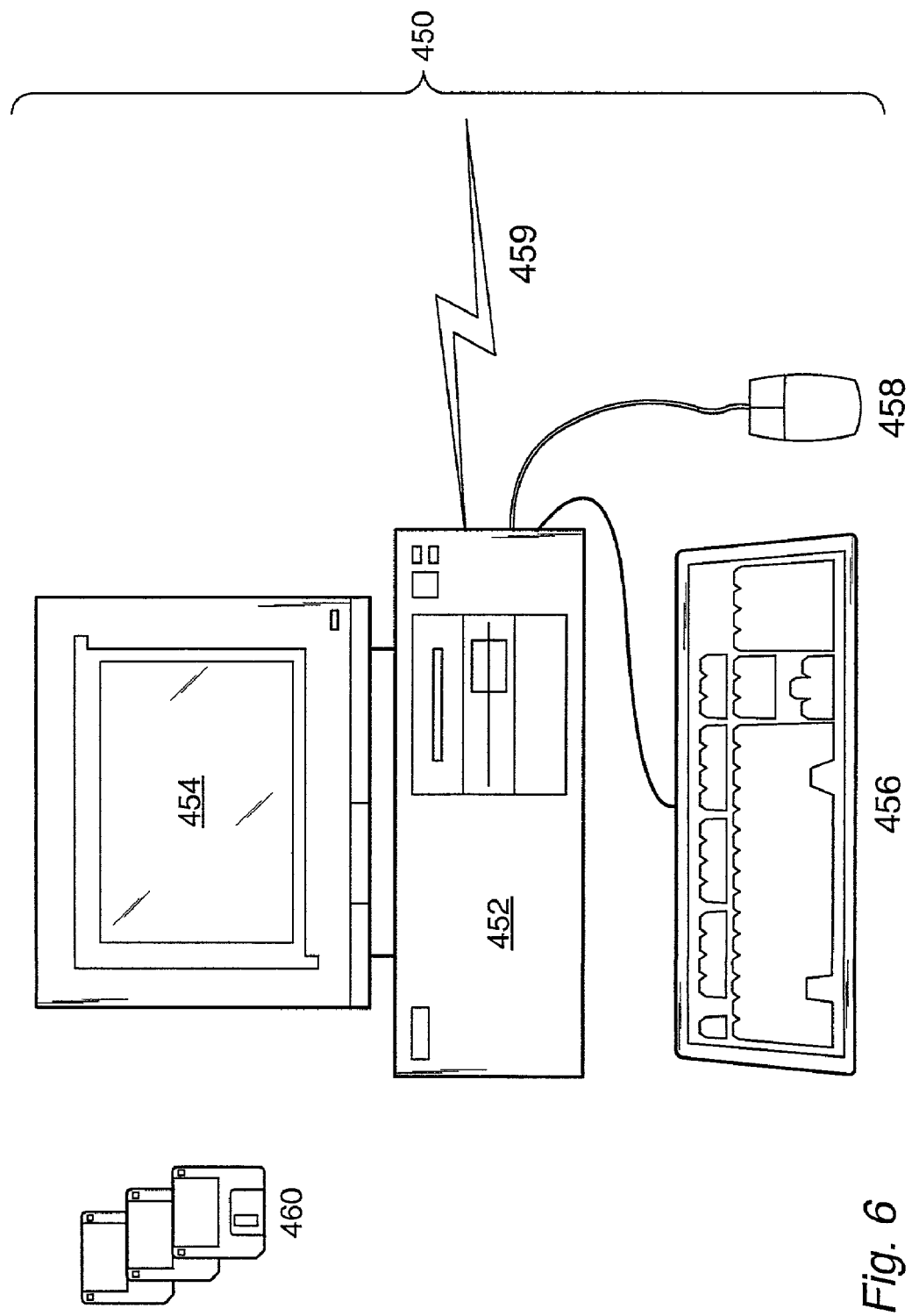
FIG. 6 is a figure illustrating one embodiment of a computer that may be used to implement one embodiment of a real time accrual basis accounting system.
Figure 7:
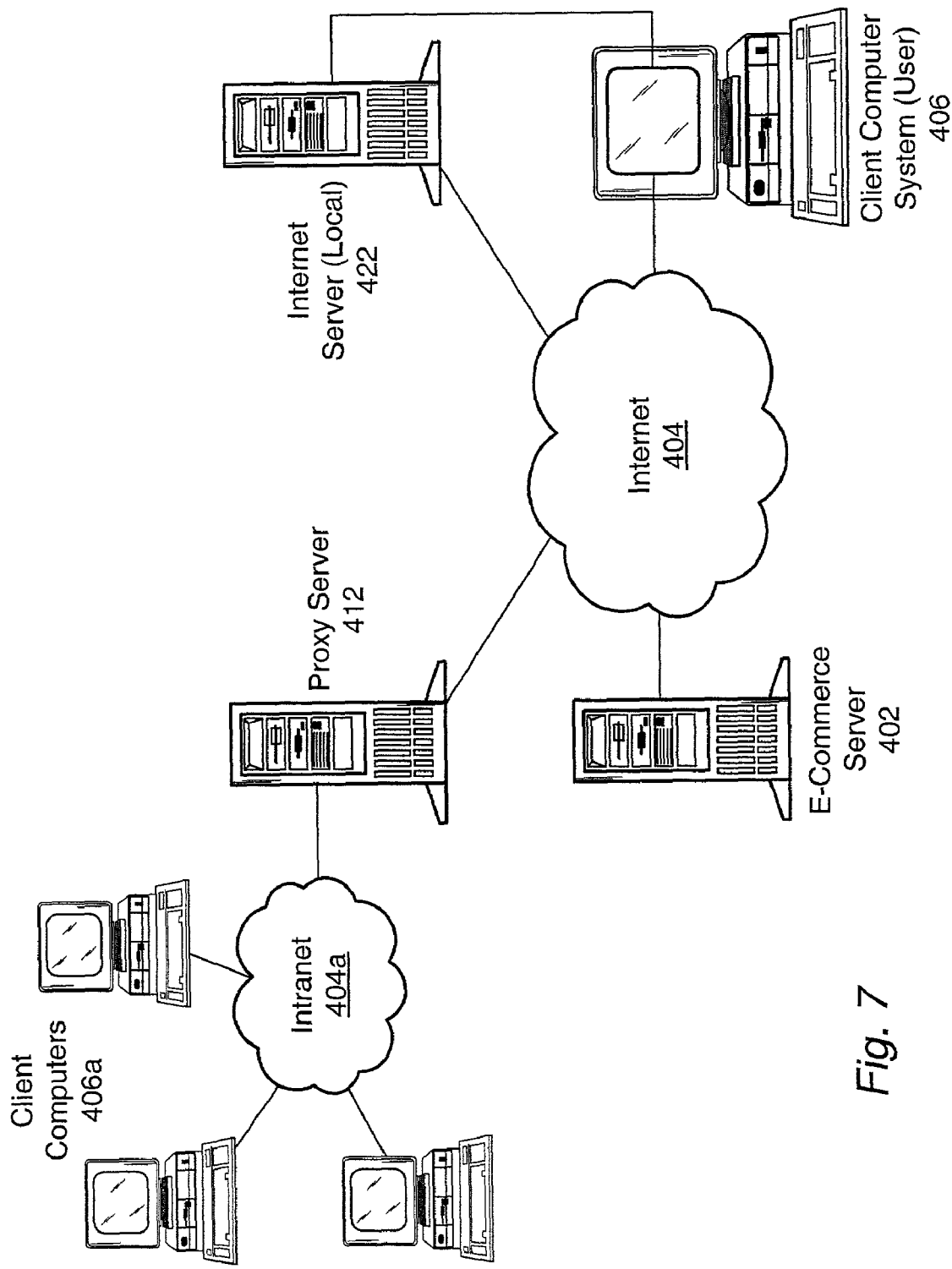
FIG. 7 is a figure illustrating another embodiment of a network that may be utilized to implement one embodiment of a real time accrual basis accounting system.

FIGS. 5-7—Example Network and Computer System

FIGS. 5-7 illustrate one embodiment of a network that may be used to implement the systems and methods of FIGS. 1-4. Network 402 is a network that spans a relatively large geographical area. The Internet is an example of WAN 402. WAN 402 typically includes several computer systems which are interconnected through one or more networks. Although one particular configuration is shown in FIG. 6, WAN 402 may include a variety of heterogeneous computer systems and networks which are interconnected in a variety of ways and which run a variety of software applications.

One or more local area networks (LANs) 404 may be coupled to WAN 402. A LAN 404 is a network that spans a relatively small area. Typically, a LAN 404 is confined to a single building or group of buildings. Each node (i.e., individual computer system or device) on a LAN 404 preferably has its own CPU with which it executes programs, and each node is also able to access data and devices anywhere on the LAN 404. The LAN 404 thus allows many users to share devices (e.g., printers) as well as data stored on file servers. The LAN 404 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 404 includes several interconnected computer systems and, optionally, one or more other devices. For example, LAN 404 may include one or more workstations 410a, one or more personal computers 412a, one or more laptop or notebook computer systems 414, one or more server computer systems 416, wireless access devices 417 (e.g., web-enabled cell phones or personal digital assistants) and one or more network printers 418. As illustrated in FIG. 5, an example LAN 404 may include one of each of computer systems 410a, 412a, 414, and 416, and one printer 418. The LAN 404 may be coupled to other computer systems and/or other devices and/or other LANs 404 through WAN 402. Private communication networks, often referred to as an Intranet 304a, may comprise of one or more LANs 404 and one or more WANs 402.

One or more mainframe computer systems 420 may be coupled to WAN 402. As shown, the mainframe 420 may be coupled to a storage device or file server 424 and mainframe terminals 422a, 422b, and 422c. The mainframe terminals 422a, 422b, and 422c may access data stored in the storage device or file server 424 coupled to or included in the mainframe computer system 420.

WAN 402 may also include computer systems that are connected to WAN 402 individually and not through a LAN 404. As illustrated, for purposes of example, WAN 402 may include a workstation 410b and a personal computer 412b. For example, WAN 402 may include computer systems that are geographically remote and connected to each other through the Internet or the Intranet.

Turning now to FIG. 6, an example of a typical computer system 450 suitable for implementing various embodiments of the system and method described herein is shown. Computer system 450 may include components such as a CPU 452 with an associated memory medium such as floppy disks 460, CD-ROM (not shown), etc. The memory medium may store program instructions for computer programs, where the program instructions are executable by the CPU 452. The computer system 450 may further include a display device such as a monitor 454, an alphanumeric input device such as a keyboard 456, communication device such as a modem 459 and a directional input device such as a mouse 458.

In one embodiment, the computer system 450 may be a client computer 406, operable by a computer user, to execute the computer programs to identify distinctive computer users accessing a web site as described herein. In another embodiment, the computer system 450 may be an e-commerce server 402 operable to execute the computer programs to identify distinctive computer users accessing a web site as described herein. Other embodiments of the computer system 450 may include, but are not limited to, a proxy server 412, a local Internet server 422, a mainframe computer, a personal computer, and several others as described herein.

The computer system 450 preferably includes a memory medium on which computer programs according to various embodiments may be stored. The term "memory medium" is intended to include an installation medium, e.g., a CD-ROM, or floppy disks 460, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed or may be located in a second different computer that connects to the first computer over a network. In the latter instance, the second computer provides the program instructions to the first computer for execution. The computer system 450 may also include a time keeping device such as a real-time clock. The real-time clock of the computer system 450 may be, periodically or on demand, synchronized with a global standard time clock. Also, the computer system 450 may take various forms, including but not limited to a personal computer system, mainframe computer system, workstation, network appliance, Internet appliance, personal digital assistant (PDA), Internet enabled PDA, web television system, Internet enabled cellular telephone or any other similar device. In general, the term "computer system" can be broadly defined to encompass any device having a processor that executes instructions from a memory medium.

The memory medium preferably stores a software program or programs for identifying distinctive computer users accessing a web site as described herein. The software program(s) may be implemented in any of various ways, including procedure-based techniques, component-based techniques, and/or object-oriented techniques, among others. For example, the software program may be implemented using ActiveX® controls, programming languages such as C++, Java®, Visual Basic®, etc., object oriented software based on COM/DCOM and/or CORBA objects, JavaBeans, Microsoft Foundation Classes (IFC), browser-based applications (e.g., Java applets), traditional programs, or other technologies or methodologies, as desired. A CPU, such as the host CPU 452, executing code and data from the memory medium includes a means for creating and executing the software program or programs according to the methods and/or block diagrams described below.

A system and method for real time accounting has been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method for real-time accounting using a networked computer system, the method comprising:
   detecting a purchase request issued to a computer system via a network;
   determining a method of payment for the purchase;
   obtaining a guarantee for the payment via the network, wherein the guarantee is based on the method of payment specified for the purchase; and
   recording the payment as income in a general ledger database, wherein said determining, said obtaining and said recording are performed automatically and substantially in real time with respect to said determining, wherein said recording is performed by automatically and periodically recording portions of the payment as income in the general ledger database, wherein the portions are determined according to a predetermined formula based on the amount of time that has lapsed since the purchase and the terms of the purchase, and wherein at least a first portion of the payment is recorded as income in the general ledger in real time.

2. The method of claim 1, wherein the guarantee is obtained from a credit card authorization server if the method of payment specified for the purchase is a credit card.

3. The method of claim 1, wherein the guarantee is obtained from a bank, credit union, or savings and loan institution if the method of payment specified for the purchase is a debit card or an electronic funds transfer.

4. The method of claim 1, wherein the guarantee is obtained from an escrow agent if the method of payment specified for the purchase is an escrow account.

5. The method of claim 1, wherein the guarantee is obtained from an insurance server.

6. The method of claim 5, further comprising:
querying a credit reporting bureau server to determine a credit rating corresponding to a customer making the purchase; and
providing the credit rating to the insurance server.

7. The method of claim 1, further comprising:
receiving depreciation updates from intelligent assets; and
adjusting a database of equipment values in response to the depreciation updates.

8. A method for real-time accounting using a networked computer system, the method comprising:
detecting a purchase request issued to a computer system via a network;
determining a method of payment for the purchase;
obtaining a guarantee for the payment via the network, wherein the guarantee is based on the method of payment specified for the purchase, and wherein the guarantee is obtained from an insurance server;
querying a credit reporting bureau server to determine a credit rating corresponding to a customer making the purchase;
providing the credit rating to the insurance server;
receiving a quote for an insurance premium for insurance to guarantee the payment;
providing an amended offer for sale with a new sales price based on the insurance premium; and
recording the payment as income in a general ledger database, wherein said determining, said obtaining and said recording are performed automatically and substantially in real time with respect to said determining.

9. The method of claim 8, further comprising:
requiring a second method of payment for the insurance premium.

10. A system for real time accounting, the system comprising:
a first server connected to computer network, wherein the first server is configured to:
detect a purchase;
determine a method of payment for the purchase;
obtain a guarantee for the payment via the network based on the determined method of payment; and
record the payment as income in a general ledger database hosted on the computer system, wherein the first server is configured to determine the method of payment, obtain the guarantee and record the payment as income automatically and substantially in real time with respect to determining the method of payment for the purchase;
wherein the server is configured to record the payment as income automatically and periodically recording portions of the payment as income in the general ledger database, wherein the portions are determined according to a predetermined formula based on the amount of time that has lapsed since the purchase and the terms of the purchase.

11. The system of claim 10, wherein the guarantee is obtained from a credit card authorization server if the method of payment is a credit card.

12. The system of claim 10, wherein the guarantee is obtained from a bank, credit union, or savings and loan institution if the method of payment is a debit card or an electronic funds transfer.

13. The system of claim 10, wherein the guarantee is obtained from an insurance server.

14. The system of claim 13, wherein the server is further configured to:
query a credit reporting bureau server to determine a credit rating for the purchase; and
provide the credit rating to the insurance server.

15. The system of claim 14, wherein the server is further configured to:
request a price quote for insurance to guarantee the payment via the network;
receive the price quote via the network;
add the price quote to an initial purchase amount; and
present for approval, via the network, new sales terms including adjusted pricing based on the price quote for the payment insurance.

16. The system of claim 15, wherein the server is further configured to:
receive depreciation updates from intelligent assets; and
adjust a database of equipment values in response to the depreciation updates.

17. The system of claim 15, wherein the server is further configured to require a second method of payment for the payment guarantee insurance.

18. A system for real time accounting, the system comprising:
a first server connected to computer network, wherein the first server is configured to:
detect a purchase;
determine a method of payment for the purchase;
obtain a guarantee for the payment via the network based on the determined method of payment; and
record the payment as income in a general ledger database hosted on the computer system, wherein the first server is configured to determine the method of payment, obtain the guarantee and record the payment as income automatically and substantially in real time with respect to determining the method of payment for the purchase;
wherein the guarantee is obtained from an escrow agent if the method of payment is an escrow account.

19. A non-transitory computer-readable storage medium storing a plurality of program instructions, wherein the plurality of program instructions is executable to:
detect a purchase by a customer connected to the computer system via a network;
determine which method of payment the customer has specified for the purchase;
obtain a guarantee for the payment via the network based on the method of payment specified by the customer;
record the payment as income in a general ledger database hosted on the computer system, wherein the plurality of instructions is executable to determine which method of payment, obtain the guarantee and record the payment as income substantially in real time with respect to determining which method of payment the customer has specified for the purchase, wherein the plurality of instructions is executable to record the payment as income by automatically and periodically recording portions of the payment as income in the general ledger database, wherein the portions are determined according to a predetermined formula based on the amount of time that has lapsed since the purchase and the terms of the purchase.

20. The non-transitory computer-readable storage medium of claim 19, wherein the guarantee is obtained from a credit card authorization server if the method of payment specified by the customer is a credit card.

21. The non-transitory computer-readable storage medium of claim 19, wherein the guarantee is obtained from a bank, credit union, or savings and loan institution if the method of payment specified by the customer is a debit card or an electronic funds transfer.

22. The non-transitory computer-readable storage medium of claim 19, wherein the guarantee is obtained from an escrow agent if the method of payment specified by the customer is an escrow account.

23. The non-transitory computer-readable storage medium of claim 19, wherein the guarantee is obtained from an insurance server if the method of payment specified by the customer is not guaranteed.

24. The non-transitory computer-readable storage medium of claim 23, further comprising:

querying a credit reporting bureau server to determine a credit rating for the customer; and providing the credit rating to the insurance server.

25. The non-transitory computer-readable storage medium of claim 24, further comprising:

receiving a price quote for insurance to guarantee the customer's payment;

adding the price quote to an initial purchase amount; and providing the customer with an opportunity to agree to new terms including adjusted pricing based on the price quote for insurance.

26. The non-transitory computer-readable storage medium of claim 25, further comprising:

requiring a second method of payment for the insurance to guarantee the customer's payment.

27. The non-transitory computer-readable storage medium of claim 19, wherein the program is further configured to receive depreciation updates from intelligent assets and adjust a corresponding database or table of equipment values accordingly.

* * * * *